United States Patent [19]
Patterson

[11] Patent Number: 5,818,590
[45] Date of Patent: Oct. 6, 1998

[54] FLANGE-SUPPORTED SENSOR COIL FOR A FIBER OPTIC GYROSCOPE

[75] Inventor: Ralph A. Patterson, Moorpark, Calif.

[73] Assignee: Litton Systems, Inc., Beverly Hills, Calif.

[21] Appl. No.: 526,725

[22] Filed: Sep. 11, 1995

Related U.S. Application Data

[63] Continuation of Ser. No. 116,376, Sep. 3, 1993, abandoned.

[51] Int. Cl.$^6$ .................................................... G01C 19/72
[52] U.S. Cl. ............................................................ 356/350
[58] Field of Search ...................................... 356/350, 345

[56] References Cited

U.S. PATENT DOCUMENTS

| | | | |
|---|---|---|---|
| 4,793,708 | 12/1988 | Bednarz | 356/350 |
| 4,856,900 | 8/1989 | Ivancevic | 356/350 |
| 4,883,337 | 11/1989 | Dahlgren | 356/350 |

FOREIGN PATENT DOCUMENTS

| | | | |
|---|---|---|---|
| 0292103 | 11/1988 | European Pat. Off. | |
| 0385682 | 2/1989 | European Pat. Off. | |
| 0391557 | 10/1990 | European Pat. Off. | |
| 0429238 | 5/1991 | European Pat. Off. | |
| 0480442 | 4/1992 | European Pat. Off. | 356/350 |
| 2146428 | 4/1985 | United Kingdom . | |

OTHER PUBLICATIONS

Article: N. Frigo, "Compensation of Linear Sources of Non–Reciprocity in Sagnac Interferometers", *Fiber Optics and Laser Sensors I*, Procs. SPIE, v. 412, p. 261 (1989);.

*Primary Examiner*—Samuel A. Turner
*Attorney, Agent, or Firm*—Elliott N. Kramsky

[57] ABSTRACT

A rotation sensor for use in a fiber optic gyroscope includes a substantially-planar disk-like coil mounting member of titanium. A would sensor coil is supported by the member in an edgewise fashion, allowing free expansion of the sensor coil in the direction orthogonal to the plane of the member to minimize thermally-induced stressing of the sensor coil. In an alternative embodiment, the free-standing coil is effectively "split"; that is, one-half is mounted to one side of the member and the remainder to the other side in such a way that the sensitive axes are coincident. Edge ramps are provided in the member for guiding the continuous optical fiber comprising the coil segments from one side of the disk-like mounting member to the other without microbends. A cylindrical inner hub includes thinned and flexible portion for contacting a mounting pedestal of stainless steel composition whereby the differential thermal expansions of the pedestal and mounting member materials will not produce misalignment of the sensor coil with respect to a predetermined input axis of rotation.

27 Claims, 4 Drawing Sheets

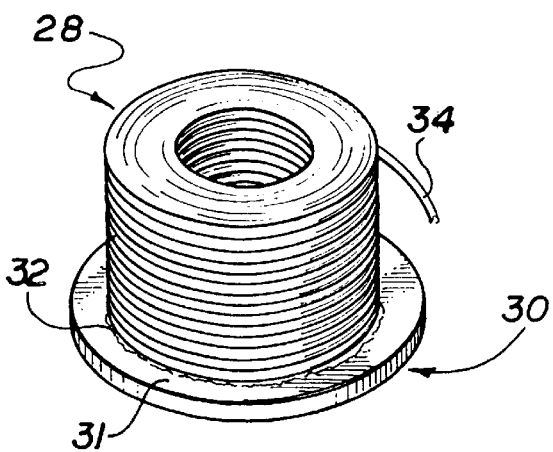
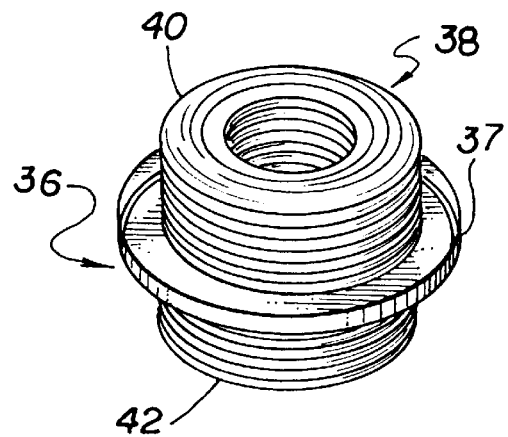
FIG. 3          FIG. 4
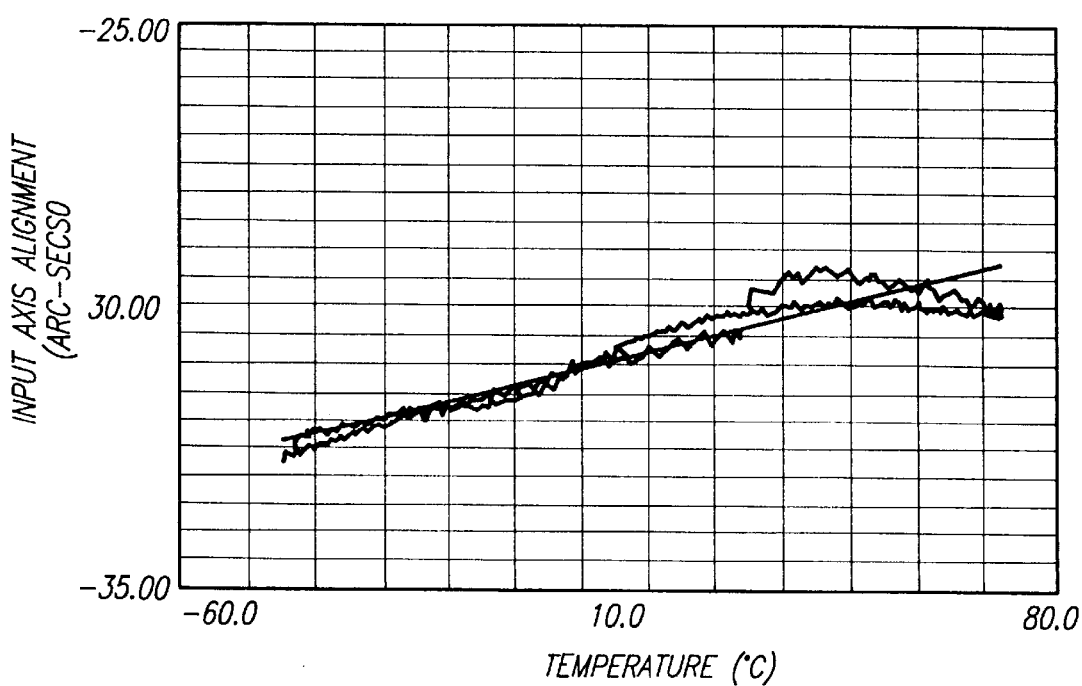
FIG. 7

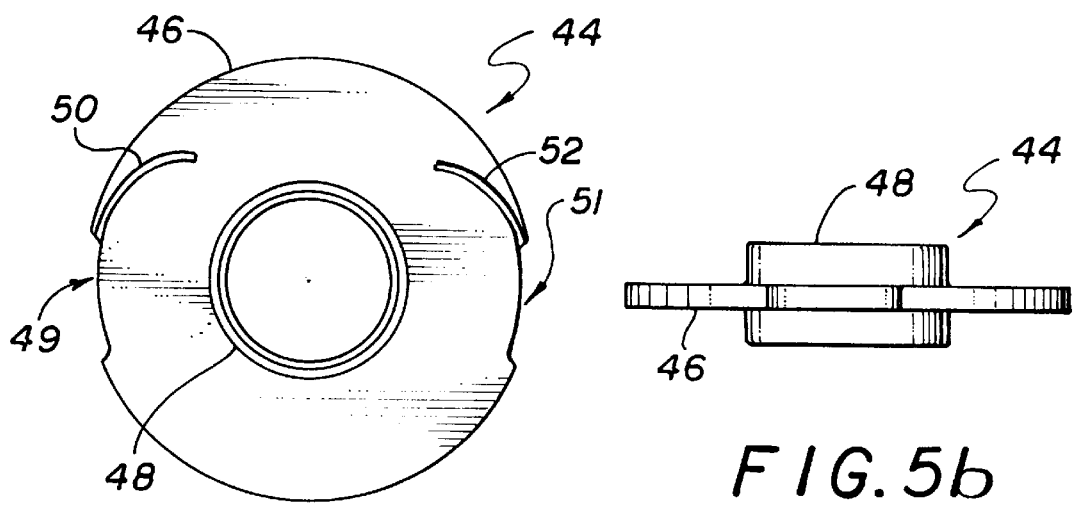
FIG. 5a
FIG. 5b
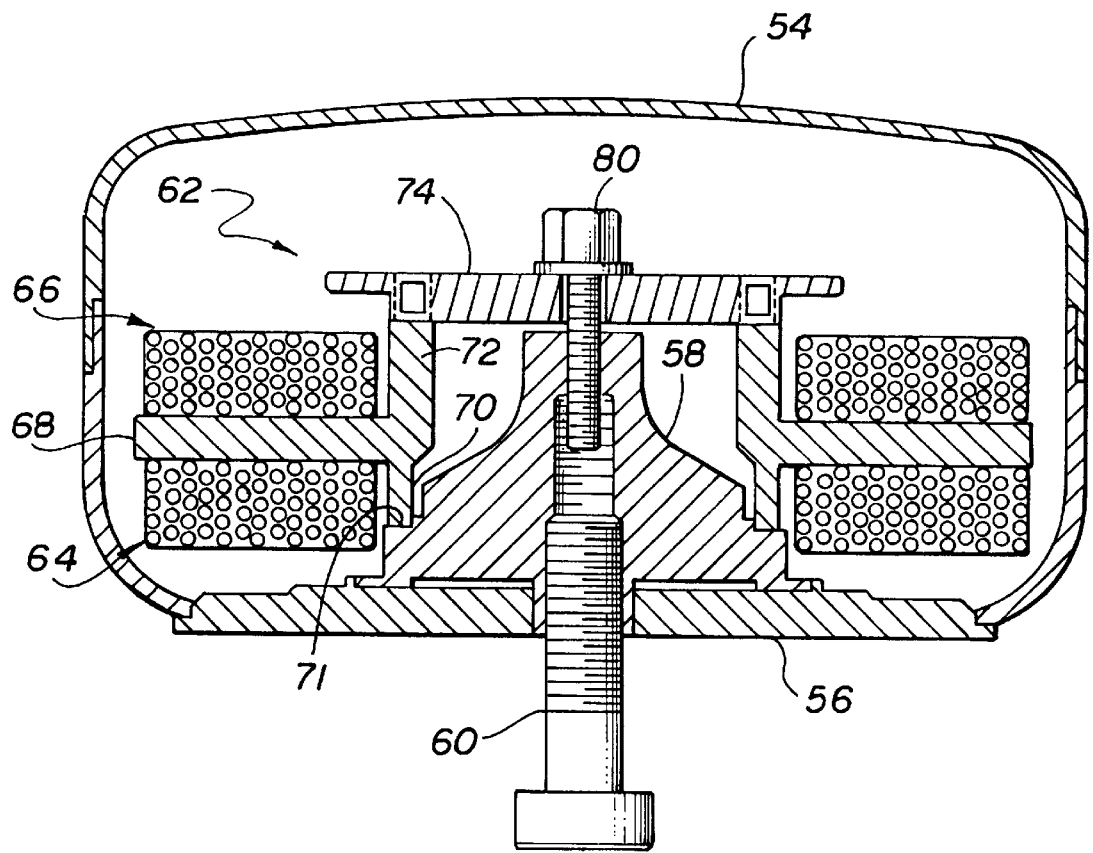
FIG. 6

FLANGE-SUPPORTED SENSOR COIL FOR A FIBER OPTIC GYROSCOPE

This application is a continuation of application Ser. No. 08/116,376 filed Sep. 3, 1993, now abandoned.

BACKGROUND

1. Field of the Invention

The present invention relates to sensor coils for fiber optic gyroscopes. More particularly, this invention pertains to apparatus for supporting a potted sensor coil to reduce temperature-induced Shupe effect due to fiber stressing.

2. Description of the Prior Art

A fiber optic gyroscope comprises the following main components: (1) a light source, (2) a beamsplitter (either a fiber optic directional coupler or an integrated-optics Y-junction), (3) a fiber optic coil, (4) a polarizer (and sometimes one or more depolarizers), and (5) a detector. Light from the light source is split by the beamsplitter into copropagating and counterpropagating waves that travel through the sensing coil. Associated electronics measures the phase relationships between the two interfering, counterpropagating beams of light that emerge from the opposite ends of the coil. The difference between the phase shifts experienced by the two beams provides a measure of the rate of rotation of the platform to which the instrument is fixed.

Environmental factors can affect the measured phase shift difference between the counterpropagating beams, thereby introducing a bias or error. Such enviromental factors include variables such as temperature, vibration (acoustical and mechanical) and magnetic fields. These are both time-varying and unevenly distributed throughout the coil and induce variations in index of refraction and length that each counterpropagating wave encounters as it travels through the coil. The phase shifts imposed upon the two waves are unequal, producing a net undesirable phase shift which is indistinguishable from the rotation-induced signal.

One approach to reducing the sensitivity arising from environmental factors has involved the use of symmetric coil winding configurations. In such coils, the windings are arranged so that the geometrical center of the winding is located at the innermost layer while the two ends of the coil are located at the outermost layers.

N. Frigo has proposed the use of particular winding patterns to compensate for non-reciprocities in "Compensation of Linear Sources of Non-Reciprocity in Sagnac Interferometers", *Fiber Optics and Laser Sensors I*, Procs. SPIE, v. 412, p. 261 (1989). Furthermore, U.S. Pat. No. 4,793,708 of Bednarz entitled "Fiber Optic Sensing Coil" teaches a symmetric fiber optic sensing coil formed by duopole or quadrupole winding. The coils described in that patent exhibit enhanced performance over the conventional helix-type winding.

U.S. Pat. No. 4,856,900 of Ivancevic entitled "Quadruple-Wound Fiber Optic Sensing Coil and Method of Manufacture Thereof" teaches an improved quadrupole-wound coil in which fiber pinching and microbands due to the presence of pop-up fiber segments adjacent to end flanges are overcome by replacing such pop-up segments with concentrically-would walls of turns that climb between connecting layers. Both of the aforementioned United States patents are the property of the assignee herein.

Pending patent application 08/017,678 of Huang et al. entitled "Apparatus For Reducing Magnetic Field-Induced Bias Errors in a Fiber Optic Gyroscope" addresses the suppression of bias errors induced by the Paraday effect in a sensor coil exposed to a magnetic field. The invention disclosed in that application (property of the assignee herein) teaches the use and design of compensator loops for counteracting the effects of both radially and axially-directed magnetic fields. In either case, a predetermined degree of twist of a preselected fiber twist mode is imposed upon the compensator loop to create a counteracting-corrective Paraday effect.

Pending U.S. patent application 07/938,294 of Cordova et al. entitled "Sensor Coil For low Bias Fiber Optic Gyroscope", also property of the assignee herein, addresses additional problems related to environmental factors. While acknowledging that the design of the sensor coil can impact the gyro's random walk, bias stability, temperature sensitivity, bias temperature-ramp sensitivity, bias vibration sensitivity, bias magnetic sensitivity, scale factor temperature sensitivity, scale factor linearity and input axis temperature sensitivity, the device disclosed in that application discloses a coil formed on spool of carbon composite material whose coefficient of thermal expansion approximates that of the overlying fiber windings. The windings are potted in an adhesive material. The application discloses that the close matching of the thermal expansion characteristics of the spool and the fiber windings as well as proper selection of the coil potting material will minimize the Shupe-like bias caused by thermal stress that would be otherwise exerted by a standard metallic spool. In addition, careful selection of the potting material (particularly in terms of modulus of elasticity) results in reduction of vibration-induced bias, coil cracking, degradation of h-parameter and temperature-ramp bias sensitivity.

While the use of a carbon composite material for the spool will tend to minimize stresses and the potting of the coil windings in an adhesive matrix is beneficial, conventional support and spool designs, which feature a substantially-cylindrical mandrel sandwiched between a pair of end flanges, are difficult to "match" to the potted coil. This is due to the asymmetry of expansions of such coils in response to temperature change. The coefficient of thermal expansion of a potted coil in the axial direction is often on the order of one-hundred (100) times that of the radial direction. Unfortunately, a corresponding asymmetry does not exist with regard to the supporting spool. Rather, spools of conventional design and material composition exhibit isotropic thermal expansion characteristics. This relative imbalance introduces bias errors through coil stressing and creates bonding and cracking problems. For example, in a spool-and-coil arrangement in which the material of the mandrel closely approximates the radial coefficient of thermal expansion of the potted coil, the axial expansion of the coil will exceed that of the mandrel. As a result, significant axial compression of the coil can occur since axial expansion is limited by the relatively "fixed" separation distance between the spool's and flanges. Further, the stressing due to differential thermal expansion coefficients at the coil-mandrel interface can result in either rupture or in coil cracking. On the other hand, in a mandrel fabricated of material closely matching the axial coefficient of thermal expansion of the coil, one may expect the relatively-grater radial expansion of the mandrel in response to temperature change to degrade performance by squeezing the fiber of the coil whose radial dimension is relatively fixed.

While environmentally-induced bias effects have generated considerable attention, as discussed above, to the proper design of the sensor coil, the thermal design of associated elements has received less attention. Yet, such mounting apparatus, including a spool and a hold-down means, necessarily contacts the coil and therefore poses a potential error source.

SUMMARY OF THE INVENTION

The present invention addresses sources of error associated with the mounting of a sensor coil for use by providing a rotation sensor for a fiber optic gyroscope that includes a substantially planar mounting flange. In a first aspect, a continuous optical fiber is arranged into a coil comprising a plurality of layers of coaxial turns. The turns of the coil are embedded in potting material of preselected composition. Means are provided for fixing the coil to the flange so that the axis of the coil is substantially orthogonal to the mounting flange.

In a second aspect, it is additionally provided that a first portion of the coil is fixed to a first planar surface of the substantially planar mounting flange and the second portion is fixed to the opposed surface. The flange includes means for guiding the continuous optical fiber between the first and second portions of the coil, such means including at least one arcuate groove located at the peripheral edge of the mounting flange.

The turns of the coil are embedded in potting material of preselected composition. Means, engaged to the flange, are provided for maintaining a predetermined alignment of the axis of the coil.

It is alternatively further provided by another aspect of the invention that the substantially-planar mounting flange is of titanium and includes (i) an annular, substantially-planar disk member, (ii) a hub located at the center of the annular disk, and (iii) portions of the hub extend axially above and below the surface of the disk member.

The hub further includes (i) a cylindrical wall, (ii) the cylindrical wall comprising axial portions of first and second thicknesses, the region adjacent the first end of the wall being of the first thickness and the region adjacent the second, opposed end of the wall being of the second thickness and (iii) that the wall undergoes a transition from the first thickness to the second thickness over an intermediate axial region adjacent the junction of the wall to the disk member.

Means are provided for maintaining a predetermined alignment of the axis of the coil. Such means includes (i) a stainless steel pedestal, (ii) means for aligning the pedestal with the predetermined axis, (iii) means for maintaining a predetermined orientation of the mounting flange with respect to the coil, (iv) a substantially-planar retainer element for securing the second end of the hub, and (v) means for fixing the retainer to the pedestal.

The pedestal includes a shoulder. The second thickness of the cylindrical wall of the hub exceeds the first thickness and the shoulder abuts the first end of the hub.

The preceding and additional features and advantages of the present invention will become further apparent from the detailed description that follows. Such description in accompanied by a set of drawing figures. Numerals of the drawing figures, corresponding to those of the written description, point to the various features of the invention. Like numerals refer to like features throughout both the drawing figures and the written description.

BRIEF DESCRIPTION OF THE DRAWINGS

FIG. 3 is a perspective view of a sensor coil engaged to a planar mounting flange (without central hub) in accordance with the invention;

FIG. 4 is a perspective view of a coil and mounting flange (without central hub) in accordance with an alternative embodiment of the invention;

FIGS. 5(a) and 5(b) are bottom plan and side elevation views respectively of a mounting flange for supporting the split coil embodiment of the prior figure;

FIG. 6 is a side elevation view in cross section of a split coil-and-mounting flange arrangement in accordance with the invention engaged to a pedestal for operation;

FIG. 7 is a graph of sensitive axis alignment error as a function of temperature for a mounted sensor coil in accordance with the invention;

DETAILED DESCRIPTION

Figure 1:
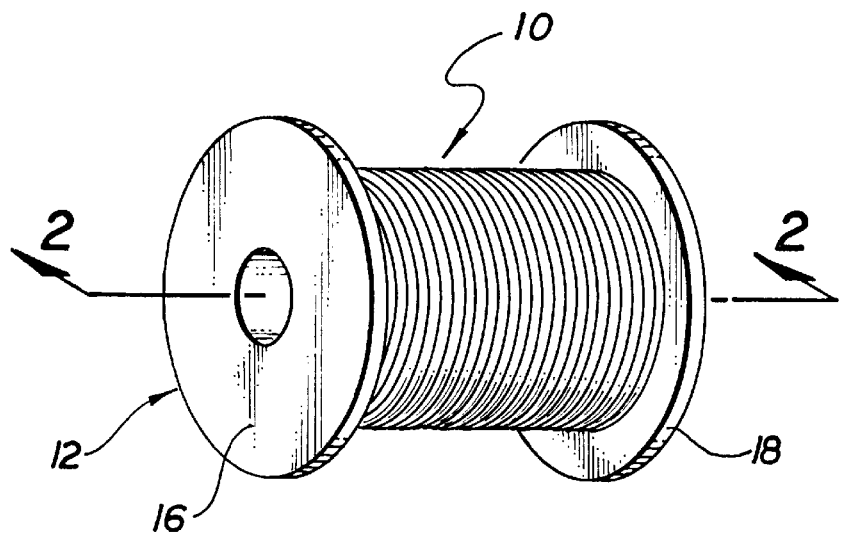
FIG. 1 is a perspective view of a sensor coil for a fiber optic gyroscope mounted upon a conventional spool.

Turning now to the drawings, FIG. 1 is a perspective view of a sensor coil 10 for a fiber optic gyroscope. The coil 10 is mounted upon a spool 12 of conventional design and provides a critical element of a fiber optic gyro system. In use, it is rigidly fixed to a platform whose rotation is to be measured, requiring means (not shown) for aligning the sensitive axis thereof with respect to the platform.

Figure 2:
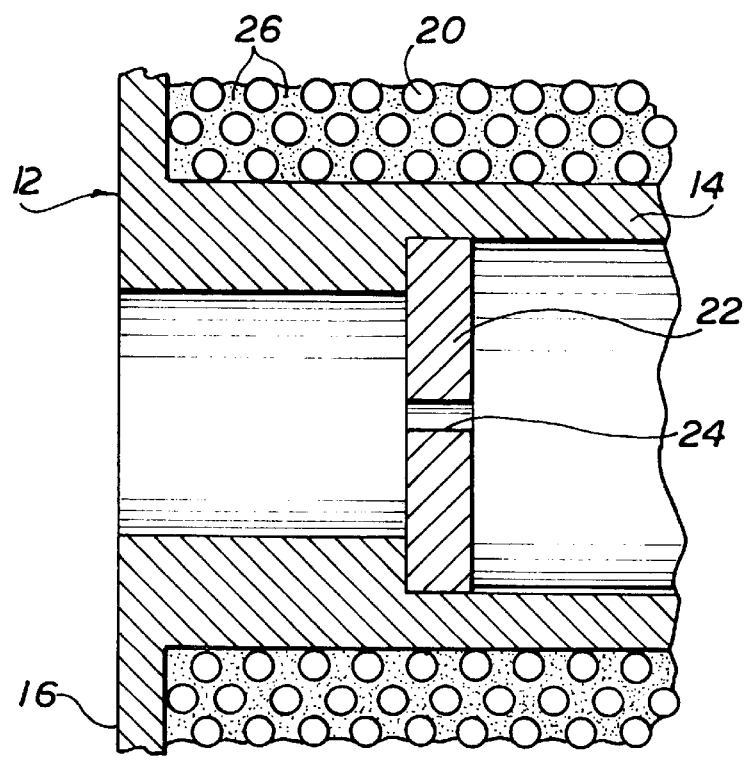
FIG. 2 is a fragmentary view in cross section of the sensor coil-and-spool of FIG. 1 taken along line 2—2 of FIG. 1.

FIG. 2 is a fragmentary view in cross-section of a portion of the coil 10-and-spool 12 arrangement taken at line 2—2 of FIG. 1. As can be seen, the spool 12 comprises a central, generally-cylindrical mandrel 14 that terminates in a pair of end flanges 16 and 18. The sensor coil 10 comprises a single continuous optical fiber 20 wound in a predetermined pattern upon the mandrel 14. A disk-like support 22 may be press-fit within the mandrel 14 and can include a central aperture 24 for receiving a fastener that secures the coil to the platform in a preferred alignment.

The spool 10 may be of metallic composition or, alternatively, of a carbon composite composition as taught by pending U.S. patent application 07/797,198 for reducing the absolute differential in thermal expansion coefficients between the optical fiber 20 and the spool 12. In this way, temperature-induced Shupe effect stresses are minimized to a first order. As further taught by that application, the fiber 20 may be embedded or potted within a matrix of adhesive material 26. In addition to enhancing winding precision, the matrix of potting material permits the designer to affect certain performance characteristics. In particular, through careful selection of the potting adhesive, sensitivity to vibration-induced bias errors is reduced.

It is highly desirable to match the thermal coefficient of the coil 10 when selecting the material of the spool 12. Unfortunately, this goal is inherently impossible to achieve with known useful materials due to the fact that a sensor coil 10 that comprises a continuous optical fiber 20 would in a generally-cylindrical or annular pattern and embedded in a matrix of potting material 26 will exhibit coefficients of thermal expansion in the radial and axial directions that differ significantly. For example, anisotropic coefficients of thermal expansion of 4 ppm/degree C (radial) and 400 ppm/degree C (axial) have been measured in representative potted coils. Such asymmetry of thermal expansion is not matched by the design and materials of the spool 12 which is essentially isotropic and non-directional in terms of its overall coefficient of thermal expansions.

FIG. 3 is a perspective view of a sensor coil 28, generally as described above, in combination with a mounting flange 30 in accordance with the invention. The arrangement of FIG. 3 discloses a basic configuration in which a free-standing coil 28 is bonded by means of a conventional adhesive layer 32 to a disk-like planar member 31 of the mounting flange 30. The coil 28 is first fabricated by winding a continuous fiber 34 in a predetermined configuration upon a winding spool. During the winding process or thereafter the coil 28 is preferably impregnated with a potting material. After the potting material has cured, the wound coil 28 may then be removed from a winding spool to obtain the free standing configuration.

The arrangement shown in FIG. 3 reduces the Shupe effect bias that the inventor has observed to result from temperature-induced stressing of the fiber 34. The inventor has traced such bias to the incompatibility inherent in the thermal expansion characteristics of conventional potted coils and spools of the type that comprise a central cylindrical mandrel terminating in opposed end flanges. As mentioned above, while the coil is anisotropic with respect to axial and radial thermal expansion, the spool to isotropic. In contrast, it will be seen that the configuration of FIG. 3 requires the designer only to concern himself with one of the distinct thermal expansion coefficients of the coil 28, the radial coefficient, since the mounting flange 30 of the invention, which possesses no confining end flanges or like apparatus, allows the coil 28 to expand axially without constraint. This eliminates the axial compression-induced stressing of the coil 28 that can occur with a conventional spool mount due to the larger coefficient of expansion of the coil 28 in the axial direction (relative to the coefficient of a conventional mandrel). The axial expansion of the coil 28 is not constrained by the invention and thus no compression reaction force can be asserted. Further, by removing the interface between the mandrel of a conventional spool and the innermost coil layer, the axial expansion of the coil 28 cannot create the stresses at the coil-to-mandrel "anchor points" that could cause both delamination of the coil from the mandrel and cracks that propagate through the coil in prior art designs at a forty-five (45) degree angle. Such cracking is observed when the internal stress exceeds the adhesive strength of the bond between the jacket of the fiber coil and the potting material (the axial expansion of a fiber coil mounted to a conventional aluminum spool can create stresses above 500 p.s.i.)

FIG. 4 is a perspective view of an alternative embodiment of the invention in which a mounting flange 36 includes a disk-like member 37 for accommodating a sensor coil 38 arranged into a back half 40 and a front half 42, the "halves" 40 and 42 (actually a misnomer since the division of the coil into two portions needn't be 50—50) being mounted to opposed surfaces of the disk-like member 37. While the embodiment of FIG. 4 will be disclosed and discussed in greater detail below, a central conceptual advantage of such configuration relates to the free-standing nature of the potted sensor coil 37. While the replacement of the central mandrel-and-end flange type spool of the prior art negates bias and other effects due to the asymmetrical coefficients of thermal expansion of the sensor coil, the absence of the axial support provided by the conventional central mandrel renders the coil (which is somewhat flexible due to the character of known potting materials) subject to stressing in response to unavoidable environmental vibrations. As the coil-and-mounting flange form a cantilevered system (a central hub of the mounting flange-discussed below-does not contact the innermost coil layer), the effects of environmental vibration become most pronounced when the frequency of vibration coincides with the natural or resonant frequency of the cantilevered coil.

Generally, the power spectral density of enviromental vibrations is a maximum in the region of 1100 Hz and decreases thereafter. It has been found that a 1 km sensor coil wound in an orthocyclic pattern and potted in a conventional adhesive material possesses a natural frequency that approximate 1100 Hz. By splitting the coil, one increases the resonant frequency of each half to beyond 2,000 Hz where environmental disturbances are minimal. For many applications, dependent upon the resultant coil geometry, it is thus highly advantageous to split the length of the cantilevered sensor coil, a result obtained by the arrangement of FIG. 4. In the case of the above-referenced 1 km sensor coil, such splitting into halves 40 and 42 of lesser lengths (each comprising about 500 meters of optical fiber), two coil segments are created, each of which possesses a resonant frequency greater than 2400 Hz. This removes the coil 38 from the range of significant stressing (and, thus, bias effects) as a result of environmentally-induced mechanical vibrations.

FIGS. 5(a) and 5(b) are bottom and side elevation views respectively of a mounting flange for supporting the split coil configuration illustrated in the preceding figure. As can be seen, the flange 44 generally comprises a disk-like planar member 46 joined to a central hub member 48 that extends therethrough. As will be seen below, the inner wall thickness of the hub 48 varies along the axial length of the hub member 48. This reflects the coupling of the hub 48 to a pedestal (not showing in FIGS. 5(a) and 5(b)). The mounting flange, preferably fabricated of a titanium alloy whose coefficient of thermal expansion closely matches the radial coefficient of thermal expansion of the potted coil, accepts the stainless steel mounting pedestal with the thinner portion thereof abutting the pedestal. As will be discussed below, the thinned portion of the wall of the hub 48 affords greater flexibility for preserving the alignment of the coil will a preselected input axis of rotation in the presence of otherwise-unbalancing radial expansion of the pedestal.

Slots 49, 51 and communicating arcuate grooves 50 and 52 are provided at the periphery of the disk-shaped member 46 for permitting a gradual transition of the fiber between the front and back sections of the sensor coil. The grooves 50 and 52 are provided in the surface of the member 46 upon which the second half of the split coil is wound providing guides for guiding the fiber to the center of member 46. (The split coil may be fabricated or wound upon the mounting flange 44 by first providing a take-up spool that is coaxial with and of greater diameter than the outside diameter of the hub 48. Preferably, a quadrupole winding pattern is employed. After one half of the split coil has been wound upon beginning one side of the disk-like member 48, one then proceeds to the other side to wind the other half of the split coil. Alternatively, the split coil could be wound inwardly from the outer periphery of the disk-shaped member 46.)

The edge slots 49, 51 and the arcuate grooves 50, 52 are located, dimensioned and designed so that the fiber "transition" (i.e. the process of exiting the last turn of the winding pattern at one side of the disk 46 until beginning the first turn of the winding pattern at the opposed side) is gradual to minimize the introduction of microbends into the coil that can produce optical bias effects. Preferably, the transition arrangements permit the transition of the fiber to take place over ¾ of a fiber turn from the end of winding of one half of the split coil to the begining of winding of the other half of the coil. However, it is believed that microbends can still be significantly reduced with an arrangement that obtains a transition from one side of the disk-like member 46 to the other over at least ¼ fiber turn.

FIG. 6 is a side elevation view in cross-section of a split coil-and-mounting flange arrangement in accordance with the invention engaged to a pedestal 58 for operation. As can be seen, the device is contained within a μ-metal shield 54 that interlocks with a base plate 56. Within the casing formed by the shield 54 and the base plate 56, the pedestal 58, preferably formed of stainless steel, receives an elongated member 60 that forms a portion of an inertial navigation system (INS). The elongated member 60 is aligned with a predetermined axis that is intended to serve as the input axis of the sensor coil 62. (Various optical and electrical components are located within the casing formed by the shield 54. However, such apparatus is not pertinent to the discussion of the invention and is therefore omitted from FIG. 6.)

The sensor coil 62 is divided into a front half 64 and a back half 66, each comprising a plurality of turns of a continuous optical fiber. The coil 62 is mounted upon the disk-like member 68 of the mounting flange as illustrated in prior FIGS. 3 through 5. The wall thickness of front half 70 of the central hub of the mounting flange, which abuts and is supported by an encircling shoulder 71 of the stainless steel pedestal 58, is thinner than that of the back half which does not abut the pedestal. As mentioned earlier, the thinner wall thickness of the front half of the hub provides added flexibility in the region of abutting pedestal and mounting flange materials of differing coefficients of thermal expansion. As a result, the angle of inclination of the disk-like portion 68 of the mounting flange is protected from misalignment when the device is subject to "excessive" thermally-induced radial expansion of the stainless steel pedestal to abut the front half wall of the hub. By including some "give" at this point, the attitude of the disk-like member 68 can remain perpendicular to the sensitive axis defined by the elongated member 60 over the expected temperature range and the sensor coil 62 will therefore remain properly aligned.

A retainer plate 74 sits atop the back or "thick" half of the mounting flange hub. The entire assembly is, in turn secured by means of a bolt 80 that completes the "sandwich" arrangement including the retainer plate 74, the pedestal 58 and the base plate 56.

In addition to the advantageous shifting of the natural frequency of the cantilevered coil structure as described above, the division of the sensor coil into two relatively-separate parts permits opportunities for device optimization that are not present in a conventional coil design. Such possibilities follow from the potential advantages inherent in "mixed" coil designs. That is, the split coil configuration presents the designer with an opportunity to employ different winding techniques and patterns when creating the front and back halves of the sensor coil 62. A number of design possibilities exist. For example, the initial or starting winding points of the front and back halves may be displaced along the sensitive axis of the coil, either adjacent or removed from the disk-like member 68. In addition, the initial layer of the front or the back half may be displaced radially, either adjacent the peripheral edge of the disk-like member or in close proximity to the hub. Also, corresponding layers of the front and back halves of the sensor coil (i.e. vertically-aligned layers of each) may be wound in opposite directions. For example, corresponding layers of the front and back halves may be wound in clockwise and counter-clockwise directions. Each of the above degrees of freedom provides the designer with an opportunity to employ mixed windings of the two portions that make up the sensor coil to obtain counteracting effects that result in the nulling of otherwise-present error sources. In addition, the split coil design permits the designer to consider minimization of the effects of environmental factors. Since the back half 66 of the split coil is so oriented as to be more exposed to enviromental factors and since coil sensitivity is a function of distance from the winding center further minimization of environmental effects can be obtained by beginning the coil winding process with the back half.

Sensor coils wound and mounted in accordance with the present invention have demonstrated good results. FIG. 7 is a graph that presents a measure of the stability of sensitive axis alignment as a function of temperature. A split coil arrangement in accordance with the teachings of this invention was employed for a 1 km sensor coil. As can be seen from the graph of FIG. 7, the temperature of the mounting flange was cycled between −55 degrees C and 65 degrees C. An input axis alignment temperature coefficient of 0.02 arc-seconds/degree C was measured with a thermal fit residual of 0.38 arc-seconds. This performance fell well within the design specification of 0.3 arc-seconds/degree C (input axis alignment temperature coefficient) and 1.5 arc-seconds (thermal fit residual).

The vibration performance of a 1 km split coil device in accordance with the invention was similarly satisfactory. By splitting the 1 km coil into two cantilevered halves, mechanical stressing due to environmental-range vibrations does not induce harmful resonances within the coil structure.

Figure 8A:
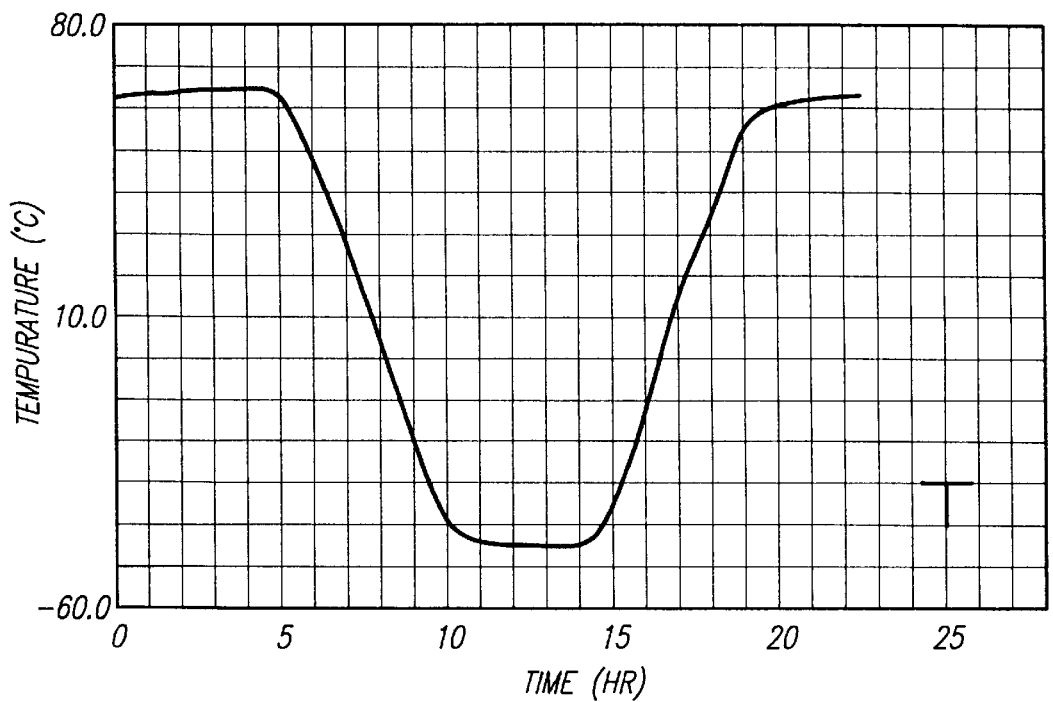
FIGS. 8(a) and 8(b) are graphs of temperature profile and gyro bias error respectively as a function of time for a sensor coil in accordance with the invention.
Figure 8B:
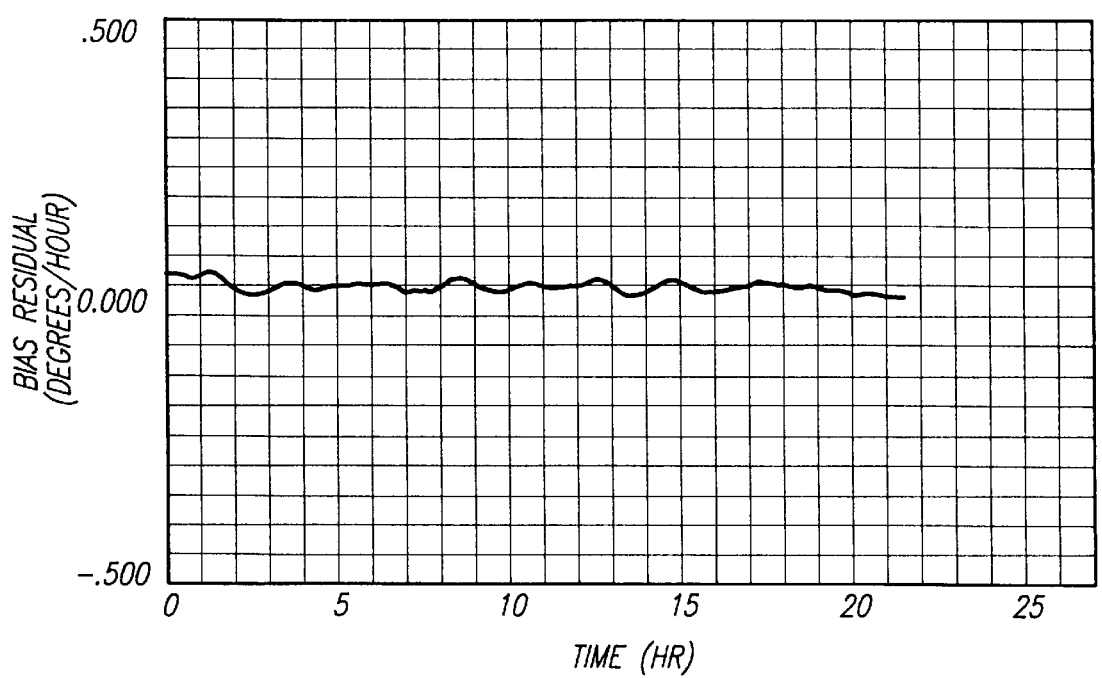

FIGS. 8(a) and 8(b) are graphs of a temperature-time profile and the resulting bias error for a 1 km coil and mounting flange in accordance with the invention. Known Shupe error factors were readily modeled out of the data of FIG. 8(b), leaving the remaining temperature-dependent errors. As can be seen, the temperature at the mounting flange was cycled between −45 degrees C and 65 degrees C. After compensating for the Shupe temperature effect, a residual bias of less than 0.0092 degrees per hour was observed over a period of 21 hours. This clearly falls within the range of acceptable gyro performance.

Thus, it is seen that the present invention provides a sensor coil arrangement for a fiber optic gyroscope that provides improved bias performance. By arranging a mounting flange, coil and pedestal in accordance with the invention, one can significantly reduce the bias error that is common to potted sensor coil arrangements mounted on conventional spools.

While this invention has been described with reference to its presently preferred embodiment, it is not limited thereto. Rather, this invention is limited only insofar as defined by the following set of patent claims and includes within its scope all equivalents thereof.

What is claimed is:

1. A rotation sensor for use in a fiber optic gyroscope comprising, in combination:
   a) a substantially-planar mounting flange;
   b) a continuous optical fiber, said fiber being arranged into a coil comprising a plurality of layers of coaxial turns;
   c) a first portion of said coil being fixed to a first planar surface of said substantially planar mounting flange and the second portion of said coil being fixed to the opposed surface of said substantially planar mounting flange;

d) the turns of said coil being embedded in potting material of preselected composition; and e) means for fixing said coil to said flange so that the axis of said coil is substantially orthogonal to said mounting flange.

2. A rotation sensor as defined in claim 1 wherein said flange includes means for guiding said continuous optical fiber between said first and second portions of said coil.

3. A rotation sensor as defined in claim 2 further including means engaged to said flange for maintaining a predetermined alignment of the axis of said coil.

4. A rotation sensor as defined in claim 3 wherein said mounting flange further comprises:

a) an annular, substantially-planar disk member;

b) a hub located at the center of said annular disk; and c) portions of said hub extend axially above and below the surface of said disk member.

5. A rotation sensor as defined in claim 4 wherein said means for guiding said continuous optical fiber includes at least one arcuate groove located at the peripheral edge of said disk member.

6. A rotation sensor as defined in claim 4 wherein said means for guiding is arranged to guide said optical fiber through at least one-fourth of a fiber turn.

7. A rotation sensor as defined in claim 4 wherein said hub further comprises:

a) a cylindrical wall; and b) said cylindrical wall comprises axial portions of first and second thicknesses, the region adjacent a first end of said wall being of said first thickness and the region adjacent a second opposed end of said wall being of said second thickness; and c) said wall having a transition from said first thickness to said second thickness at an intermediate region adjacent the junction of said wall to said disk member.

8. A rotation sensor as defined in claim 7 wherein said means for maintaining a predetermined alignment of the axis of said coil further includes:

a) a pedestal;

b) means for aligning said pedestal with said predetermined axis; and c) means for maintaining a predetermined orientation of said mounting flange with respect to said coil.

9. A rotation sensor as defined in claim 8 further characterized in that;

a) said mounting flange is of titanium;

b) said pedestal is of stainless steel;

c) said pedestal includes a shoulder;

d) said second thickness exceeds said first thickness of said cylindrical wall; and e) said shoulder abuts said first end of said hub.

10. A rotation sensor as defined in claim 9 wherein said means for maintaining a predetermined alignment further includes a substantially-planar retainer element for securing said second end of said hub.

11. A rotation sensor as defined in claim 10 further including means for fixing said retainer to said pedestal.

12. A rotation sensor for use in a fiber optic gyroscope comprising, in combination;

a) a substantially-planar mounting flange;

b) a continuous optical fiber, said fiber being arranged into a coil comprising a plurality of layers of coaxial turns;

c) a first portion of said coil being fixed to a first planar surface of said substantially planar mounting flange;

d) the second portion of said coil being fixed to the opposed surface of said substantially planar mounting flange;

e) said flange including means for guiding said continuous optical fiber between said first and second portions of said coil, said means including at least one arcuate groove located adjacent the peripheral edge of said mounting flange;

f) the turns of said coil being embedded in potting material of preselected composition;

g) means for fixing said coil to said flange so that the axis of said coil is substantially orthogonal to said mounting flange; and h) means engaged to said flange for maintaining a predetermined alignment of the axis of said coil.

13. A rotation sensor for use in a fiber optic gyroscope comprising, in combination;

a) a substantially-planar mounting flange of titanium including (i) an annular, substantially-planar disk member; (ii) a hub located at the center of said annular disk; and (iii) portions of said hub extend axially above and below the surface of said disk member;

b) said hub further including (i) a cylindrical wall; (ii) said cylindrical wall comprising axial portions of first and second thicknesses, the region adjacent a first end of said wall being of said first thickness and the region adjacent a second opposed end of said wall being of said second thickness; and (iii) said wall undergoing a transition from said first thickness to said second thickness over an intermediate axial region adjacent the junction of said wall to said disk member;

c) a continuous optical fiber, said fiber being arranged into a coil comprising a plurality of layers of coaxial turns;

d) the turns of said coil being embedded in potting material of preselected composition;

e) a layer of adhesive material for fixing said coil to said flange so that the axis of said coil is substantially orthogonal to said mounting flange;

f) means for maintaining a predetermined alignment of the axis of said coil, said means including: (i) a stainless steel pedestal; (ii) means for aligning said pedestal with said predetermined axis; (iii) means for maintaining a predetermined orientation of said mounting flange with respect to said coil; (iv) a substantially-planar retainer element for securing said second end of said hub; and (v) means for fixing said retainer to said pedestal;

g) said pedestal includes a shoulder;

h) said second thickness exceeds said first thickness of said cylindrical wall; and i) said shoulder abuts said first end of said hub.

14. A rotation sensor for use in a fiber optic gyroscope comprising, in combination:

a) a substantially-planar mounting flange, said flange being of material characterized by a first coefficient of thermal expansion;

b) a continuous optical fiber, said fiber being arranged into a coil comprising a plurality of layers of coaxial turns;

c) the turns of said coil being embedded in potting material of preselected composition whereby said potted coil is characterized by a second coefficient of thermal expansion in the radial direction and by a third, grater coefficient of thermal expansion in the axial direction;

d) means for fixing said coil to said flange so that the axis of said coil is substantially orthogonal to said mounting flange; and e) said second coefficient of thermal expansion being closer in value than said third coefficient of thermal expansion of said potted coil to the first coefficient of thermal expansion of said mounting flange.

15. A rotation sensor as defined in claim 14 further including means engaged to said flange for maintaining a predetermined alignment of the axis of said coil.

16. A rotation sensor as defined in claim 14 wherein said mounting flange further comprises;

a) an annular, substantially-planar disc member; and b) a hub mounted to said annular disk.

17. A rotation sensor as defined in claim 14 further comprising:

a) a cylindrical wall; and b) said cylindrical wall comprises axial portions of first and second thickness, the region adjacent of first end of said wall being of said first thickness and the region adjacent second, opposed end of said wall being of said second thickness; and c) said wall having a transition from said first thickness to said second thickness at an intermediate region adjacent the junction of said wall to said planar flange.

18. A rotation sensor as defined in claim 17 further including:

a) a pedestal;

b) means for aligning said pedestal with said predetermined axis; and c) means for maintaining a predetermined orientation of said mounting flange with respect to said coil.

19. A rotation sensor as defined in claim 18 further characterized in that:

a) said mounting flange is of titanium;

b) said pedestal is of stainless steel;

c) said pedestal includes a shoulder;

d) said second thickness exceeds said first thickness of said cylindrical wall; and e) said shoulder abuts said first end of said hub.

20. A rotation sensor as defined in claim 19 wherein said means for maintaining a predetermined alignment further includes a substantially-planar retainer elements for securing said second end of said hub.

21. A rotation sensor as defined in claim 20 further including means for fixing said retainer to said pedestal.

22. A rotation sensor for use in a fiber optic gyroscope comprising, in combination;

a) a substantially-planar mounting flange, said flange including an annular, substantially-planar disk member and a hub fixed to said annular disk;

b) a continuous optical fiber, said fiber being arranged into a coil comprising a plurality of coaxial turns;

c) the turns of said coil being embedded in potting material of preselected composition; and d) one end of said coil being fixed to said flange so that the axis of said coil is substantially orthogonal to said flange and the opposed end of said coil is unconstrained.

23. A rotation sensor as defined in claim 22 wherein said hub further comprises:

a) a cylindrical wall;

b) said cylindrical wall comprises axial portions of first and second thickness, the region adjacent of first end of said wall being of said first thickness and the region adjacent of second, opposed end of said wall being of said second thickness; and c) said wall having a transition from said first thickness to said second thickness and at an intermediate region adjacent the junction of said wall to said disk member.

24. A rotation sensor as defined in claim 23 further including:

a) a pedestal;

b) means for aligning said pedestal with said predetermined axis; and c) means for maintaining a predetermined orientation of said mounting flange with respect to said coil.

25. A rotation sensor as defined in claim 26 further characterized in that:

a) said mounting flange is of titanium;

b) said pedestal is of stainless steel;

c) said pedestal includes a shoulder;

d) said second thickness exceeds said first thickness of said cylindrical wall; and e) said shoulder abuts said first end of said hub.

26. A rotation sensor as defined in claim 25 wherein said means for maintaining a predetermined alignment further includes a substantially-planar retainer element for securing said second end of said hub.

27. A rotation sensor as defined in claim 26 further including means for fixing said retainer to said pedestal.

* * * * *